April 28, 1970 G. WILKINSON ET AL 3,509,531

SIGNAL ALIGNMENT SYSTEM

Filed Aug. 24, 1967 2 Sheets-Sheet 1

April 28, 1970 G. WILKINSON ET AL 3,509,531

SIGNAL ALIGNMENT SYSTEM

Filed Aug. 24, 1967 2 Sheets-Sheet 2

INVENTORS.
GREGORY WILKINSON
LEWIS B. COON, JR.
BY Christie, Parker & Hale
ATTORNEYS.

United States Patent Office 3,509,531

Patented Apr. 28, 1970

3,509,531

SIGNAL ALIGNMENT SYSTEM

Gregory Wilkinson, San Gabriel, and Lewis B. Coon, Jr., Pasadena, Calif., assignors to Burroughs Corporation, Detroit, Mich., a corporation of Michigan Filed Aug. 24, 1967, Ser. No. 662,947
Int. Cl. H04l 1/00
U.S. Cl. 340—146.1 7 Claims

ABSTRACT OF THE DISCLOSURE

A plurality of information registers, one register for each of a plurality of channels of data. Each information register has a plurality of stages for receiving and storing bits of data appearing in the channels. There is an individual indicator register for each of the information registers for indicating when a stage of the information register is full. A shift control circuit causes the content of the registers to be shifted in the registers causing information to be read out thereof in parallel. A parity check circuit detects the lack of parity in signals which are being read out and a gating circuit is provided for correcting parity of the information in the information registers.

BACKGROUND OF THE INVENTION

The field of the invention

This invention relates to circuits for aligning signals appearing on a plurality of data channels, and more particularly, to apparatus having a buffer for storing and aligning a plurality of characters represented by digital signals.

Description of the prior art

Modern storage devices are known which provide a series of characters of information to another device in a data processing system. Examples of such devices are magnetic tape transports, magnetic recording drums, magnetic recording disks, and others. Many times the bits of information of each character are read out and transmitted in parallel over a plurality of channels. It has been found that it is difficult to align the bits of information so that they are transmitted precisely in parallel over the channels, particularly when transmitting at very high speeds. It has also been found that where a series of characters are transmitted, the misalignment of the bits may be so great that the bits of one character may overlap in time with bits of another character. Accordingly, systems have been devised to store and align the bits for each character.

One such prior art system has a number of different channels on which the bits of each character are transmitted. An information register is provided for each channel having 1 through N stages. The bits of data are stored in the stages of the information register as they are received. The bits are stored in the lowest numbered stage which is vacant. An indicator register is provided for each information register also having 1 through N stages each settable for indicating when the correspondingly numbered information register is full. A shift control circuit is provided for shifting the bits of a character in parallel.

However, the shift control circuit contains an OR gate which senses when Stage 1 of each register is full to cause shift out to occur. As a result, the parity checking and correcting must be done outside of the information registers resulting in a costly system.

SUMMARY OF THE INVENTION

In contrast with the prior art, a preferred embodiment of the present invention comprises a system for aligning the bits of a character. A character comprises a plurality of bits and the purpose of the system is to align the bits so that all bits of a character appear in parallel at the same instant in time. Each bit of a character appears on a different channel. An information register is provided for each channel having Stages 1 through N. The bits of data data are stored as they are received in the lowest numbered stage which is vacant in the corresponding register. An indicator register is provided for each information register having Stages 1 through N, each settable for indicating when the correspondingly numbered information register stage is full. The shift control circuit is coupled to all the information registers and is operative in response to the indication from any one of the indicator stages N for shifting the content of all information registers one stage in the direction of Stage 1, causing the content of Stage 1 to be read out in parallel.

Thus the present invention shifts when it is detected that any one of the information registers is full. This is in contrast to the prior art where shifting is done when it is detected that there is a bit of information in Stage 1 of all of the information registers.

In the preferred embodiment of the present invention, means is provided for correcting the parity of a character before it is shifted out of the buffer.

An advantage of the present invention is that it results in a much simpler and less costly system than the aforementioned prior art system. A major factor in the reduced cost is the fact that parity is easily corrected right in the information registers before the information is shifted out.

These and other advantages of the present invention may be more fully understood with reference to the following description.

DESCRIPTION OF THE PREFERRED EMBODIMENT

Figures 1, 1A:
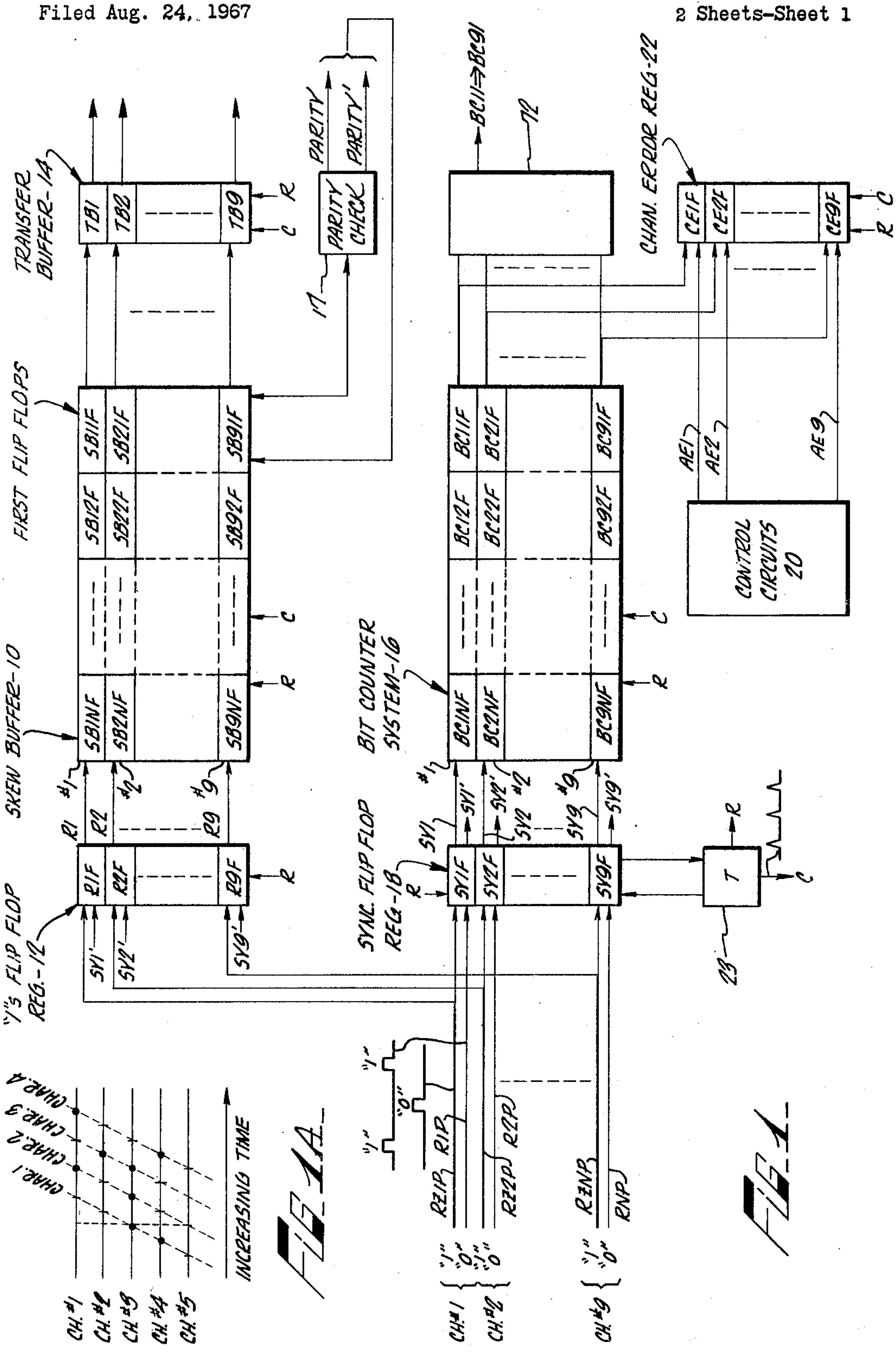
FIG. 1 is a general block diagram of the signal alignment system and embodying the present invention.
FIG. 1A is a sketch giving an example of how information on a plurality of channels can be misaligned.

Before considering the details of the circuits involved, consider an example of information and the way in which the bits may be misaligned with reference to FIG. 1A. In the embodiment of FIG. 1, nine channels are shown. Only five channels are shown in FIG. 1A, the rest being indicated by dashed lines. The channels of information are represented by horizontal lines, whereas the characters are represented by diagonal lines. Increasing time is represented by moving from left to right in FIG. 1A. Diagonal lines are used to represent the characters to indicate that the bits of each character are not received simultaneously but are received at different times. It will also be noted that the bits of character #1 in channels 5, 4 and 3 are received before the bits of any other character. However, the bits of character #1 for channels 1 and 2 are received after the bit of character #2 for channel 5. Therefore, it is necessary to receive and store the bits of more than one character so that the bits of each character can be aligned and transmitted out in parallel.

To this end, a skew buffer 10 is provided in FIG. 1. The skew buffer has nine different registers called "information registers." Each information register has N different stages. The stages comprise conventional flip-flops. Flip-flops SB11F, SB12F . . . SB1NF comprise the top information register and flip-flops SB91F, SB92F . . . SB9NF comprise the bottom information register in the skew buffer 10. Only information registers #1, #2 and #9 are shown in FIG. 1, the rest being indicated by dashed lines. Similarly, only the first two flip-flops and the last flip-flop of each information register is shown, the rest being indicated by dashed lines.

N represents the total number of flip-flops in an information register. N may be any number and is selected according to the amount of misalignment expected in the information coming in. For example, if N is 3, then there are three flip-flops in each register, and the maximum amount by which the bits of one character can overlap the bits of another character is three bits.

A flip-flop has two stable states referred to herein as "1" and "0" states. A flip-flop is said to store a binary "1" bit when in a "1" state and to store a binary "0" bit when in a "0" state.

Corresponding to the nine information registers in the skew buffer 10, there are nine different channels of information. Each channel of information has two lines, one of which is called a 1's line and the other a 0's line. Positive pulses are used to represent information. A positive pulse on the 1's line represents a binary "1" bit whereas a positive pulse on the 0's line represents a binary "0" bit. The 1's line is represented by the symbol RXP and the 0's line is represented by the symbol RZXP. X is used in the aforegoing symbols to represent the number of the corresponding channel. For example, Channel #1 has the 0's line RZ1P and the 1's line R1P.

A 1's flip-flop register 12 has one flip-flop for each information register in the skew buffer 10. The flip-flops are referred to as R1F through R9F, the numbers corresponding to the number of the associated channel. The 1's flip-flop register 12 is used as a buffer to store the pulses appearing on each channel prior to the time that the information is stored in the skew buffer 10.

The output of the skew buffer 10 is connected to a transfer buffer 14. The transfer buffer 14 has flip-flops TB1F through TB9F corresponding to the nine information registers and nine channels. The bits of a character of information are first aligned in the buffer 10 and are then read out in parallel and stored in the transfer buffer 14. The bits of a character may be tranferred from the transfer buffer 14 to any other device as desired.

A parity check circuit 16 is used to check the parity of the bits stored in the first flip-flops of the information registers. The parity check circuit is a conventional circuit well known in the computer art that generates a signal on the PARITY output circuit when an error in parity is detected in the signals stored on the first flip-flops of the information registers. The skew buffer 10 corrects the parity of a character before it is transferred over to the transfer buffer 14. Correct parity is an odd number of "1" bits. Accordingly, the PARITY check circuit 17 generates a signal on the parity output when parity is correct and there is an odd number of 1's stored in the first flip-flop of each information register. A signal is generated on the PARITY' output circuit when parity is incorrect and an even number of 1's are stored.

It should be understood that the invention is not restricted to odd parity but the correct parity can be even within the scope of the invention.

The bit of a character appearing on a channel is stored in the lowest numbered flip-flop of an information register which is vacant. For example, the first bit on channel #1 is stored in SB11F and when it is full the next character which is received is stored in SB12F, etc.

A bit counter system 16 is provided to control the position in the skew buffer 12 where the incoming bits of information are stored and to control the shifting of information in the skew buffer 10. The bit counter system 16 has a bit counter or register for each information register in the skew buffer 10. Thus, there is one bit counter in the system 16 for each channel of information. Each bit counter has the same number of flip-flops as there are flip-flops in an information register of the skew buffer 10. For example, if there are three flip-flops in each information register, then each bit counter has three flip-flops.

Bit counter #1 corresponds to information register #1 and has flip-flops BC11F through BC1NF where N represents the total number of flip-flops in an information register. Bit counter #2 corresponds to information register #2 and has flip-flops BC21F through BC2NF, etc. Only bit counters #1, #2 and #9 are shown in FIG. 1, the rest being indicated by dashed lines. Similarly, only the first, second and last flip-flops are shown in each bit counter, the rest being indicated by dashed lines.

Each flip-flop of a bit counter is used to identify the corresponding flip-flop in the corresponding information register of the skew buffer 10 which contains information. The reason that this is necessary is that the skew buffer 10 is initially set to 0 and a flip-flop of the skew buffer only changes state when a "1" bit is to be stored in the particular flip-flop. Accordingly, there is one flip-flop in the bit counter 16 which is set into a "1" state whenever information is stored in a flip-flop of the skew buffer. The bit counter flip-flop is set to a "1" state regardless if the corresponding bit of information is a "1" bit or a "0" bit.

A synchronizing flip-flop register 18, hereinafter referred to as a sync flip-flop register, has one flip-flop for each channel. The flip-flops of the sync flip-flop register 18 are represented by the symbols SY1F through SY9F, the numbers corresponding to the number of the associated channel. The flip-flops of the register 18 serve as a buffer between the information pulses appearing on the channels and the bit counter system 16 and also serve to synchronize information which is occurring asynchronously.

Control circuits 20 are provided in the system for indicating when an error has occurred in the bits of one of the channels. For example, if a signal on tape, disk or other source for one of the channels drops out, the control circuits 20 provide a signal indicating that this error has occurred. The control circuits 20 have a different output circuit corresponding to each of the nine channels. The output circuits are represented by the symbols AE1 through AE9, the number in each symbol corresponding to the correspondingly numbered channel. The details of the control circuits 20 are not given and are not important to an understanding of the present invention.

A channel error register 22 is provided for storing a signal indicating that an error has already occurred in one of the channels of information. One flip-flop is provided in the channel error register 22 for each channel of information. The flip-flops of the channel error register 22 are represented by the symbols CE1F, CE2F through CE9F, the number in each symbol corresponding to the correspondingly numbered channel.

The timing generator 23 has a source of clock pulses therein and provides clock pulses at the output circuit represented by the symbol C which are used at the indicated places in the system. The timing generator 23 also provides a reset signal at an output labeled R that causes all flip-flops shown in FIG. 1 to be reset to state "0." The timing generator 23 also causes the sync register flip-flops to be reset as described in more detail hereinafter.

Consider now the general operation of the signal alignment system shown in FIG. 1. A series of characters of information represented by pulses appear on channels #1 through #9. Initially, all flip-flops in the system are reset to a "0" state by the timing generator 23 which generates a control pulse on the line R.

Thereafter, each time a pulse appears on either the 1's line or the 0's line of a particular channel, conventional gating (not shown) in the sync flip-flop register 18 sets the corresponding flip-flop to a "1" state. If the particular pulse appears on the 1's line, then conventional gating (not shown) in the 1's flip-flop register 12 sets the corresponding flip-flop to a "1" state. However, if the pulse appears on the 0's line, then the corresponding flip-flop of the register 12 remains in a "0" state.

Incoming bits of information are stored in the skew buffer 10 in the lowest numbered stage (of the corresponding information register) which is vacant. In other words, the first bit of information received on channel #1 is stored in SB11F, the second bit in SB12F, etc.

Assume now that the SY1F flip-flop of register 18 is set to a "1" state indicating that a bit has been received and that the R1F flip-flop of register 12 has been set to a "1" state, indicating that the bit which was received is a "1" bit. Subsequently, the "1" states of flip-flops SY1F and R1F are set into flip-flops SB11F and BC11F, respectively, of the skew buffer 10 and the bit counter system 16.

At this point the BC11F flip-flop of the bit counter system 16 is in a "1" state indicating that the SB11F flip-flop of the skew buffer is storing information and the SB11F flip-flop is in a "1" state representing a binary "1" bit.

After the BC11F flip-flop is set to a "1" state the timing generator 23 causes the SY1F flip-flop to be reset to a "0" state ready for the next bit of information on channel #1. The other flip-flops in the sync register 18 are reset to a "0" state in a similar manner once a flip flop in the corresponding bit counter register is set. The timing generator 23 has conventional gating (not shown) which senses when a flip-flop in one of the bit counters is set to a "1" state and resets the corresponding sync flip-flop to a "0" state. The gating in the timing generator is conventional gating well known in the computer art and the detail thereof are not given as they are not important to a complete understanding of the present invention.

Returning to the skew buffer 10, if the bit on channel #1 were a "0" bit rather than a "1" bit, then the SB11F flip-flop would still be in a "0" state. However, the bit counter flip-flop BC11F being in a "1" state would indicate that the SB1F flip-flop contains information. The next bit of information received on channel #1 is stored in flip-flop SB12F and bit counter flip-flop BC12F is set to a "1" state indicating the presence of information in the SB12F flip-flop.

The operation for the other channels is similar to that described for the channel #1. The operation continues as described above until any one of the bit counter registers #1 through #9 has its flip-flop BCXNF set to a "1" state, thereby indicating that the corresponding register of the skew buffer 10 is full and the corresponding synchronizing flip-flop SYXF is set to a "1" state indicating that the next bit of information is received in the corresponding channel. When these conditions occur and the corresponding flip-flop CEXF is in a "0" state, a shift control signal is formed which causes the information of the first stage of all registers in the skew buffer 10 to be shifted out to the transfer buffer 14 and causes the contents of the rest of the information in each information register to be shifted one flip-flop in the direction of the first flip-flop in each information register. At the same time, the bit counter flip-flops which correspond to the flip-flops in the skew buffer 10 which have become vacant are reset to a "0" state indicating that the corresponding flip-flops in the skew buffer 10 no longer contain information. This allows subsequently received bits of information to be stored in the vacant flip-flops of the skew buffer 10.

Assume now that the control circuits 20 form a control signal at one of the output circuits AE1 through AE9 indicating that a signal bit of information is missing on one of the channels. For purposes of explanation, assume that this occurs in channel #1 and that the signal is formed at the output circuit AE1. The channel error flip-flop CE1F is set to a "1" state. This causes channel #1 of both the bit counter system and the skew buffer to disregard any information coming in on channel #1, and not change state.

Each character of information appearing on the channels has a preselected parity. In the present case the parity is odd. If an exen number of 1's are contained in any character, this indicates that there is an error in the character and corrective action needs to be taken on the character. The parity of the characters is used to correct a character when a bit is missing from one of the channels. All checking of parity and all correction of the parity of information are only performed on the first flip-flop in each information register (i.e. SB11F . . . SB91F). To this end, the parity check circuit 17 is provided which detects the parity of the character stored in the first flip-flop of each information register. If parity is correct nothing happens. However, if the parity is incorrect, then a signal is formed on the PARITY′ output circuit. Gating is provided (see FIG. 2) which complements the first flip-flop of the information register which corresponds to the channel error flip-flop which is in a "1" state when a signal appears on the PARITY output circuit. In this manner, parity of the character is corrected. The content of the first flip-flop in each information register of the skew buffer 10 is then shifted out and stored into the transfer buffer 14 and the proper flip-flops in the bit counter 16 are reset to mark the proper skew buffer flip-flops as being vacant as described hereinabove.

To be explained in more detail hereinafter, the channel error flip-flops may also be set when one of the information registers has not received a bit of information but one of the other information registers is full and a new bit of information is being received on the corresponding channel. This again will cause the parity of the character which is about to be shifted to be corrected.

Figure 2:
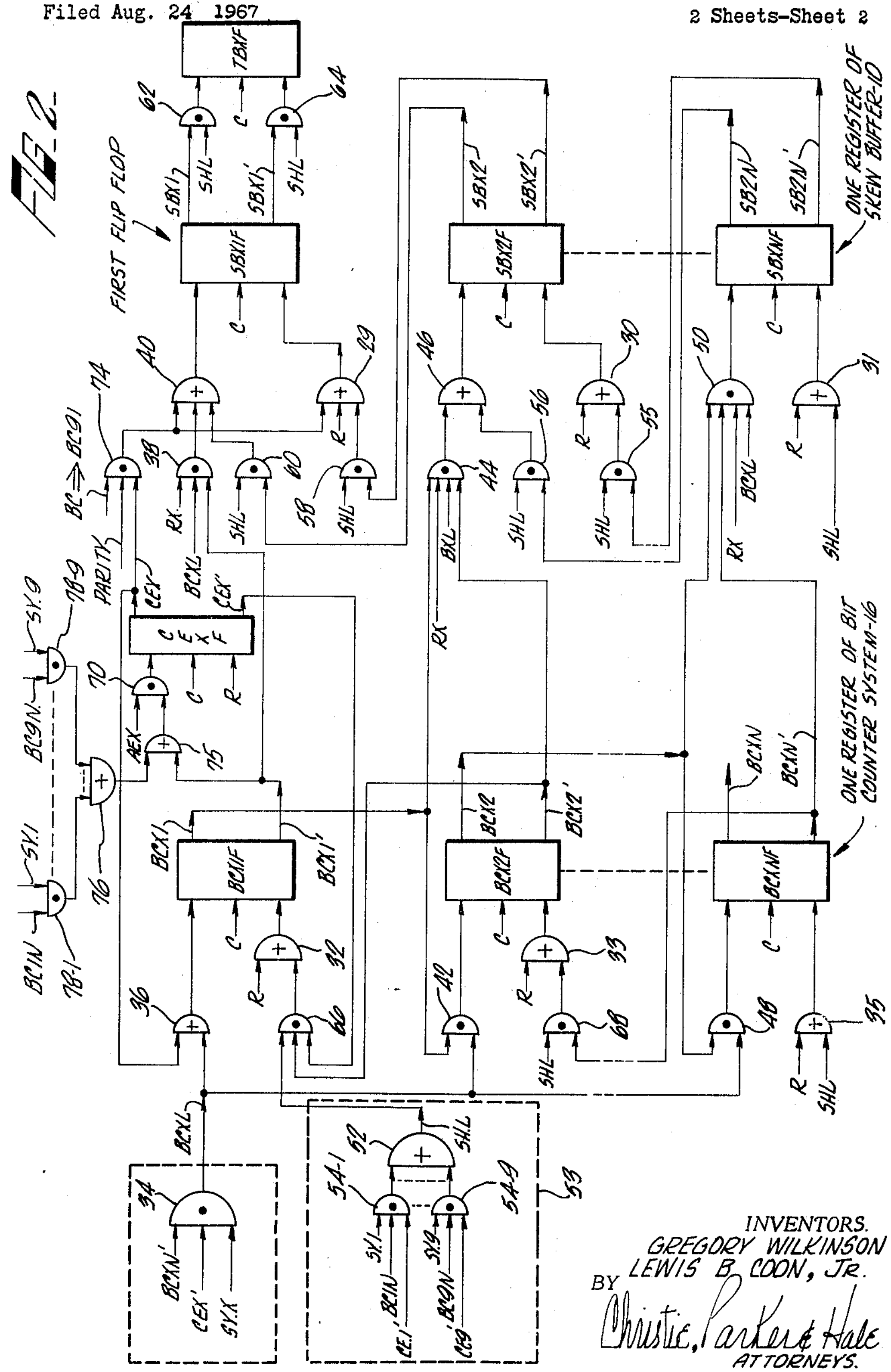
FIG. 2 is a generalized block diagram showing the details of one channel of the skew buffer, bit counter, and channel error register shown in FIG. 1.

With the general organization of FIG. 1 in mind, consider now the details of the circuit shown in FIG. 2. One information register of the skew buffer 10 and one bit counter of the bit counter system 16, along with the corresponding flip-flop of the channel error register 22 are shown in FIG. 2.

FIG. 2 is actually a generalized diagram which illustrates the gating used in the system of FIG. 1 in each channel. Symbol "X" is used in the symbols shown in FIG. 2 in place of one of the numerals 1 through 9 to represent one of the nine channels. By substituting the number of a particular channel for the symbol "X," the gating for the particular channel is identified. For example, the flip-flops of the information register are represented by the symbols SBX1F, SBX2F . . . SBXNF. For information register #1 of the skew buffer, these symbols become SB11F, SB12F . . . SB1NF. For register #9, the symbols become SB91F, SB92F . . . SB9NF, etc. The stages of the registers of the bit counter system 16 can be derived in a similar manner. The symbol "X" is also used in the symbols for many of the inputs to the gating circuits shown in FIG. 2. It will be understood that the symbol "X" can refer to any channel and if it is desired to determine the gating for any particular channel, the number of the channel is substituted for the symbol "X."

One further convention used in the symbols will be explained. The flip-flops are represented by a group of symbols followed by the letter "F." The two outputs of each flip-flop are represented by the same group of symbols with the letter "F" removed, the symbol for one output being primed and one being unprimed.

For example, flip-flop BCX1F has outputs BCX1′ and BCX1. The unprimed outputs receive a control signal when the corresponding flip-flop is in a "1" state and the primed output receives a control signal when in a "0" state.

It should also be noted that each flip-flop shown in FIG. 2 has an input connected to the output "C" (see FIG. 1) of the source of clock pulses. Each of these flip-flops have internal circuitry causing each to change state at the occurrence of a clock pulse when the appropriate input lines are true.

Consider now the operation and gating for storing a bit of information into one of the flip-flops of an information register of the skew buffer 10 and for setting the corresponding flip-flop of the bit counter. Initially, the control signal is applied on the reset line R by the timing generator 23 (see FIG. 1). This causes an "OR" gate 29 for flip-flop SBX1F, an "OR" gate 30 for flip-flop SBX2F and an "OR" gate 31 for flip-flop SBXNF to reset the corresponding stages to 0. Similarly, the control signal at R causes the "OR" gates 32, 33 through 35 to reset the flip-flops BCX1F, BCX2F through BCXNF of the bit counter to "0." The control signal at R also resets all of the channel error flip-flops to state "0."

Assume now that one of the sync flip-flops in the sync register 18 is set to a "1" state indicating that a bit of information is received. The bit causing the sync flip-flop to be set may either be a "1" bit or a "0" bit. Consequently, the corresponding 1's flip-flop may either be set to a "1" state or to a "0" state. In either case, the BCX1F flip-flop is set to a "1" state indicating that a bit of information is stored in the flip-flop SBX1F. Consider this action. At this point, the flip-flop BCXNF in the bit counter register is in a "0" state, the corresponding channel error flip-flop CEXF is in a "0" state and the SYXF flip-flop is in a "1" state. Consequently control signals are formed at the output circuits BCXN′, CEX′ and SYX′. This causes the flip-flop BCX1F to be set to a "1" state at the following clock pulse by an "AND" gate 34 and an "OR" gate 36.

It should be noted that the output of "AND" gate 34 is represented by the symbol BCXL. This output should be kept in mind as it is connected at various other places in the system of FIG. 2.

Continuing with the operation, consider how the information register flip-flop SBX1F is set when a "1" bit is received. The corresponding 1's flip-flop RXF is in a "1" state causing a control signal at the output RX and the flip-flop BCX1F is in a "0" state (not having been set as yet) causing a control signal at the BCX1′ output. These conditions cause "AND" gate 38 and "OR" gate 40 to set the SBX1F flip-flop to a "1" state at the same clock pulse that set the BCX1F flip-flop.

Thus, the information register flip-flop SBX1F stores a "1" bit. If the bit received was a "0" bit then the RXF flip-flop would not have been in a "1" state and there would not have been a control signal at the RX output. Under these conditions the SBX1F flip-flop would have remained in a "0" state.

Subsequently, the timing generator 23 causes the corresponding sync flip-flop SYXF to be reset to a "0" state removing the control signal at the SYX output.

Assume now that another bit of information is received on the same channel. This time the bit of information must be stored in the SBX2F flip-flop because the SBX1F flip-flop is full.

Consider first the setting of the BCX2F flip-flop. The BCXNF and CEXF flip-flops are still both in the "0" state and the corresponding sync flip-flop SYXF is again set to a "1" state. Control signals are again formed at the BCXN′, CEX′ and SYX output causing another control signal at the BCXL output. Additionally, the BCX1F flip-flop is in a "1" state causing a control signal at the BCX1 output thereof. This causes the "AND" gate 42 to apply a control signal to the BCX2F flip-flop and the following clock pulse triggers flip-flop BCX2F into a "1" state indicating the presence of information in the flip-flop SBX2F.

The same clock pulse that sets the BCX2F flip-flop sets the SBX2F flip-flop, if a "1" bit is received. Consider this action. A control signal is also formed at the BCX2′ output and if a "1" bit is received the corresponding 1's flip-flop RXF is in a "1" state causing a control signal at the output RX. This causes an "AND" gate 44 and an "OR" gate 46 to apply a control signal to the SBX2F flip-flop and the same clock pulse triggers the SBX2F flip-flop into a "1" state. If the particular bit happened to be a "0" bit, then the corresponding 1's flip-flop RXF would be in a "0" state. No control signal would be formed at the RX output and the SBX2F flip-flop would remain in a "0" state.

The gating and operation for the other flip-flops of the bit counter register and skew buffer register is similar to that described above. Each new bit of information which is received on the same channel causes the next higher numbered flip-flop in sequence in the same bit counter to be set to a "1" state and the corresponding flip-flop of the skew buffer is set to a "1" state or remains in a "0" state depending on whether a "1" bit or a "0" bit is received.

This further operation will be understood if it will be noted that flip-flops BCX2F through BCXNF each have an "AND" gate with one input connected to the BCXL output and one input connected to the unprimed output of the preceding bit counter flip-flop. As a result, each new input bit which is received on a channel causes the next higher numberd bit counter flip-flop in order to be set.

It will also be noted that each of the skew buffer flip-flops SBX2F through SBXNF has an "AND" gate connected directly or indirectly through an "OR" gate to its input, the "AND" gate having an input connected to the output of the next lower numbered flip-flop in the bit counter register and an input connected to the unprimed output of the correspondingly numbered flip-flop in the bit counter register. For example, "AND" gate 44 is connected to flip-flop SBX2F and has an input connected to the BCX1 output and an input connected to the BCX2′ output. Similarly, the SBXNF flip-flop has "AND" gate 50 with inputs connected to the BCX2 output and the BCXN′ output. As a result, information is stored in a skew buffer flip-flop whenever the next lower numbered bit counter flip-flop is in a "1" state and the correspondingly numbered bit counter flip-flop is in a "0" state.

Consider now how information is shifted through the flip-flops and out of one of the information registers in the skew buffer 10. As already indicated, one bit of information is shifted out of each information register of the skew buffer whenever any one of the registers is full and the next information pulse arrives. An information register in the skew buffer 10 is full whenever each flip-flop, hence the BCXNF flip-flop, in the corresponding information register is in a "1" state.

The circuit 53 applies a control signal at an output circuit SHL causing shifting to take place. It should be noted that in contrast to the other circuits in FIG. 2, which are individual for each channel, the same circuit 53, which provides the output signal at SHL, is used for all of the channels of information.

The circuit 53 has an "OR" gate 52 connected to the output circuit of "AND" gates 54–1 through 54–9. Only "AND" gates 54–1 and 54–9 are shown in FIG. 2. The "AND" gates 54–1 through 54–9 correspond to the channels 1 through 9, respectively. Also, the inputs to the "AND" gates 54–1 through 54–9 come from circuits which are associated with the channel corresponding to the particular "AND" gate. For example, "AND" gate 54–1 has its inputs connected to the outputs SY1, BC1N and CE1. Similarly, the "AND" gate 54–9 has its inputs connected to the outputs SY9, BC9N and CE9. The "AND" gates of circuit 53 which are not shown in FIG. 2, have inputs connected to the corresponding output circuit for the corresponding channels as do the "AND" gates which are shown.

Consider the operation of the circuits of FIG. 2 when a shift takes place. Assume now that the flip-flop BC1NF (FIG. 1) is in a true state indicating that the information register #1 of the skew buffer 10 is full. Additionally, assume that the next bit of information is received in channel #1 and the sync flip-flop SY1F has been set to a "1" state, and assume that the channel error flip-flop CEF is in a "0" state. Control signals are now formed at the outputs SY1, BC1N and CE1′ causing the gates 54–1 and 52 to apply a control signal at the SHL output. These conditions will cause a shift in the information in register #1 and also cause the appropriate bit counter flip-flops to be reset indicating that the corresponding skew buffer flip-flops have become empty.

The control signal at the SHL output is applied to the "OR" gates 31, 55, 56, 58 and 60. The gates 31 and 55 through 60 control the corresponding flip-flops of the skew buffer causing information to be shifted from one flip-flop to the next towards the first flip-flop SBX1F. Thus, the control signal at SHL ceauses the SBXNF flip-flop to be reset to a "0" state at the following clock pulse if it was initially in a "1" state. If the SBXNF flip-flop initially stores a "1" bit then the "AND" gate 56 and the "OR" gate 46 causes the flip-flop SBX2F to be set to a "1" state (if initially in a "0" state) at the same clock pulse. If, on the other hand, the SBXNF flip-flop was initially in a "0" state, the SBX2F flip-flop will be set to a "0" state (if initially in a "1" state) under control of the "AND" gate 55 and "OR" gate 30. Similarly, the "AND" gate 60 and "OR" gate 40, and the "AND" gate 58 and the "OR" gate 29 cause the SBX1F flip-flop to be set to a "1" state or a "0" state depending on the storage content of the SBX2F flip-flop. In this manner, the signal at SHL output causes information to be shifted from one flip-flop to the next towards the first flip-flop in the corresponding information register.

The circuits for shifting the signals out of an information register will now be considered. "AND" gates 62 and 64 are responsive to the control signal at SHL for shifting out the content of the SBX1F flip-flop into the TBXF flip-flop of the transfer buffer 14. Accordingly, the control signal at SHL causes the content of each register of the skew buffer to be shifted one flip-flop in the direction of the first flip-flop SBX1F and the content of the flip-flop SBX1F is shifted out to the transfer buffer 14 at the very same time.

At the same time that the shift operation takes place and flip-flops in the information registers become empty, the appropriate flip-flops in the bit counter 16 are reset to "0" indicating that the corresponding information register flip-flops have become vacant. It should be noted that it is the information register flip-flop which corresponds to the highest numbered bit counter flip-flop that is in a "1" state which becomes vacant during a shift. Therefore, the bit counter flip-flop which is reset to "0" is the one which is the highest numbered one in a "1" state. To this end, a bit counter flip-flop of each bit counter is reset to a "0" state when the particular flip-flop is in a "1" state and the next higher numbered flip-flop is storing in a "0" state. Considering the specific gating an "AND" gate 66 has its inputs connected to the outputs SHL, BCX2′ and CEX′ and applies a control signal through the "OR" gate 32 to reset the BCX1F flip-flop in response to a shift control signal at SHL, a control signal at BCX2′ caused by a BCX1F flip-flop in a "0" state and a control signal at CEX′ caused by the CEFX flip-flop in a "0" state. The BCX2F flip-flop has a corresponding "AND" gate 68 which has an input connected to the BCXN′ output and the SHL output. A control signal at BCXN′ and SHL causes the "AND" gate 68 and the "OR" gate 33 to reset the BCXF flip-flop to a "0" state. The BCXNF flip-flop has its input for causing it to be reset connected through the "OR" gate 35 to the SHL output and, therefore, it can be reset solely in response to the control signal at SHL. It should be noted that the bit counter flip-flops are reset to a "0" state to mark an information register flip-flop vacant at the occurrence of the same clock pulse that causes the shift in the information registers.

Consider now an error condition wherein one of the bits in one of the channels is missing and the control circuits 20 apply a control signal to the channel error register 22 indicating this error. The corresponding channel error flip-flop CEXF is set to a "1" state. This causes the rest of the information in the particular channel to be disregarded for the rest of the record. To fill in the bits in the channel which are in error the corresponding first flip-flop BCX1F is set to a "1" state to mark a bit in the particular channel as being present and then the first flip-flop in the corresponding information register is complemented or not as needed to arrive at the correct parity for the particular character of information. It will be appreciated that the limitation on this type of correction scheme is that only one of the channels can have an error. If more than one channel has an error then the system fails and other corrective action needs to be taken. However, an error in any more than one channel is an abnormal condition and need not be considered in this particular patent application.

First, the operation of setting the first bit counter flip-flop BCX1F will be considered. The CEXF flip-flop in a "1" state causes the "OR" gate 36 to apply a control signal to the BCX1F flip-flop and the following clock pulse causes this flip-flop to be set to a "1" state.

Consider now how the first flip-flop for the information register corresponding to the channel in error is set to the correct state and thereby form the correct character. Assume now that the first flip-flop SBX1F of each of the skew buffer registers has been marked as being full by the one state of each of the BCX1F flip-flops in the bit counter system 16. The "1" state of the BCX1F flip-flops causes a gating circuit 72 to apply a control signal at the BC11=>BC91 output (see FIG. 1). The control signal at the BC11=>BC91 output is applied to "AND" gate 74. This signal, in coincidence with a signal at the PARITY ouput and the signal at the CEX output, causes "AND" gate 74 to apply a control signal through the "OR" gate 40 and through the "OR" gate 29 to both of the control inputs to the SBX1F flip-flop. The SBX1F flip-flop is a J–K type of flip-flops that changes state when a control signal is applied to both inputs at the same time. Therefore, the flip-flop SBX1F is complemented regardless of its previous state.

It should also be noted that an error in parity is corrected by complementing the appropriate flip-flop prior to the time that the shifted control signal is formed on the SHL output of the circuit 53, hence, prior to the time that information is shifted out of the information registers. This is because the flip-flop is complemented as soon as the first flip-flop in each of the skew buffer registers is marked as being full by the appropriate bit counter flip-flops. It is not until later that the next bit of information is received at one of the channels causing one of the sync flip-flops of register 18 to be set to a "1" state thereby causing one of the gates 54–1 through 54–9 to cause a control signal at the shift output SHL and a shift to occur.

In addition to the control signals formed by the control circuits 20, the "AND" gate 70 receives a control signal from an "OR" gate 75 causing the channel error flip-flop CEXF to be set to a "1" state thereby indicating an error. The "AND" gate 75 applies a control signal causing the CEXF flip-flop to be set to a "1" state whenever one of the information registers in the skew buffer 10 is full, as indicated by the "1" state of the corresponding BC11F through BC91F flip-flops and the corresponding sync flip-flop in register 18 is in a "1" state thereby indicating the next bit of information has been received. The gate 75 is coupled through an "OR" gate 76 to "AND" gates 78–1 through 78–9. The "AND" gates 78–1 through 78–9 correspond to the channels #1 through #9. The "AND" gate 78–1 has its inputs connected to the output circuits BC1N and SY1. The "AND" gate 78–9 has its input connected to the outputs BC9N and SY9, etc. Only "AND" gates 78–1 and 78–9 are shown, it being understood that the other "AND" gates are included and have their inputs connected to the corresponding output circuits for the corresponding channels as the "AND" gates 78–1 and 78–9. Therefore, whenever one of the registers of the skew buffer 10 is full, causing a control signal on the output circuit at BC1N through BC9N and the corresponding sync flip-flop of register 18 is in a "1" state causing a control signal at one of the outputs SY1 through SY9, a control signal is applied through the "OR" gate 76 to the "AND" gate 75. If the BCX1F flip-flop is in a "0" state, indicating that the corresponding flip-flop of the skew buffer has not been filled, a control signal is applied by the "OR" gate 70 to the CEXF flip-flop causing it to be set to a "1" state at the following clock pulse. The "1" state of the CEXF flip-flop causes the BCXF flip-flop to be set to a "1" state at the next subsequent clock pulse thereby indicating that the corresponding flip-flop of the skew buffer 10 has been filled as described hereinabove. Immediately thereafter the SBX1F flip-flop is complemented under control of the "AND" gate 74 if so required to correct the parity of the character contained in the first flip-flops of the information registers. This complementing takes place in the manner described hereinabove.

Although one preferred embodiment of the invention and an alternate has been shown by way of example to illustrate the present invention, it should be understood that many rearrangements and modifications are possible within the scope of the present invention as defined in the following claims.

We claim:

1. In a system for aligning a series of characters each character comprising a plurality of data bits, each bit of a character appearing on a different channel, the system comprising an information register for each channel each having Stages 1 through N, an indicator register for each information register having Stages 1 through N each settable for indicating when the correspondingly numbered information register stage is full, the bits of data being stored as they are received in the lowest numbered information register stage which is vacant in the corresponding register, shift control means coupled to all said information registers and operative in response to the indication from any one of said indicator stages N for shifting the content thereof one stage in the direction of state 1 causing the content of stage 1 of all information registers to be read out in parallel.

2. In a system as defined in claim 1 additionally comprising means for providing a separate indication for each channel when an error has occurred in the corresponding channel of data, means for individually setting indicator stage 1 corresponding to a particular information register when an error indication for the corresponding channel is formed, parity check means for providing a parity error indication in the absence of a preselected parity of the combined bits in stage 1 of all said information registers, and gating means for each information register stage 1 for complementing the content of the corresponding information register stage 1 in response to said parity error signal when stage 1 in all indicator registers indicates that the corresponding information register stage 1 is full and thereby correct the bits being shifted out of the information registers.

3. In a system as defined in claim 1 additionally comprising a channel error stage for each information register settable to indiate that there is an error in the corresponding channel of bits, gating means for each channel error stage for setting same in the absence of said indication from stage 1 of the corresponding indicator register when indicator stage N of any indicator register forms said indication, a parity check circuit for providing a parity error signal in the absence of a preselected parity of the combined bits in stage 1 of all said information registers, and gating means for each information register stage 1 for complementing the content thereof in response to the set condition of the corresponding channel error stage and a parity error signal when each indicator register stage 1 indicates that the corresponding information register stage 1 is full.

4. In a system as defined in claim 3 additionally comprising means individual for each channel for indicating the absence of a bit in a channel, each of said channel error stage gating means alternatively being responsive to a signal indicating the absence of a bit in the corresponding channel for setting the corresponding channel error stage thereby indicating an error in the corresponding channel.

5. In a system as defined in claim 1 wherein the shift control means is responsive to the coincidence of a signal from any one of said indicator stages N and an additional data bit in the corresponding channel for performing said shifting.

6. In a system for aligning a series of characters each character comprising a plurality of data bits, each bit of a character appearing on a different channel, the system comprising an information register for each channel having stages 1 through N, an indicator register for each information register having stages 1 through N each settable for indicating when the correspondingly numbered information register stage is full, the bits of data in each channel being stored as they are received in the lowest numbered stage which is vacant in the corresponding information register, a channel error stage for each information register settable to indicate that there is an error in the corresponding channel of bits, gating means for each channel error stage for setting same in the absence of said indication from stage 1 of the corresponding indicator register when indicator stage N of any indicator register forms said indication, a parity check circuit for providing a parity error signal in the absence of a preselected parity of the combined bits in stage 1 of all said information registers, and gating means for each information register stage 1 for complementing the content thereof in response to the set condition of the corresponding channel error stage and a parity error signal when each indicator register stage 1 indicates that the corresponding information register stage 1 is full.

7. In a system as defined in claim 6 additionally comprising means individual for each channel for indicating the absence of a bit in a channel, each of said channel error stage gating means alternatively being responsive to the corresponding indicating means for setting the corresponding channel error stage thereby indicating an error in the corresponding channel.

References Cited

UNITED STATES PATENTS

| | | | |
|---|---|---|---|
| 2,937,366 | 5/1960 | Sims | 340—174.1 |
| 2,991,452 | 7/1961 | Welsh | 340—174.1 X |
| 3,144,635 | 8/1964 | Brown et al. | 340—146.1 |
| 3,154,762 | 10/1964 | Morphet | 340—174.1 X |
| 3,206,737 | 9/1965 | Lee et al. | 340—174.1 |

OTHER REFERENCES

Scherr & Heilweil: A System for Deskewing Tape Signals, IBM Technical Disclosure Bulletin, vol. 6, No. 8, January 1964.

Morphet: Excessive Skew Error Correction, IBM Technical Disclosure Bulletin, vol. 8, No. 4, September 1965.

MALCOLM A. MORRISON, Primary Examiner

C. E. ATKINSON, Assistant Examiner

U.S. Cl. X.R.

235—153; 340—174.1